United States Patent [19]

Hwang

[11] 4,038,638

[45] July 26, 1977

[54] EFFICIENT REARRANGEABLE MULTISTAGE SWITCHING NETWORKS

[75] Inventor: Frank Kwangming Hwang, Piscataway Township, Middlesex County, N.J.

[73] Assignee: Bell Telephone Laboratories, Incorporated, Murray Hill, N.J.

[21] Appl. No.: 691,898

[22] Filed: June 1, 1976

[51] Int. Cl.² ............................................. H04Q 3/52
[52] U.S. Cl. ......................... 340/166 R; 179/18 GF; 340/147 C
[58] Field of Search ........... 340/166 R, 147 C, 147 R; 179/18 GF, 18 J, 18 FH, 18 EA

[56] References Cited

U.S. PATENT DOCUMENTS

| | | | |
|---|---|---|---|
| 3,129,407 | 4/1964 | Paull | 340/147 R |
| 3,317,897 | 5/1967 | Ceonzo et al. | 179/18 GF |
| 3,358,269 | 12/1967 | Benes | 340/166 R |
| 3,458,658 | 7/1969 | Aro | 179/18 J |
| 3,638,193 | 1/1972 | Opferman et al. | 179/18 GF |
| 3,727,006 | 4/1973 | Jacob | 179/18 J |
| 3,906,175 | 9/1975 | Joel, Jr. | 179/18 GF |
| 3,920,923 | 11/1975 | Schonemeyer | 179/18 GF |
| 3,980,834 | 9/1976 | Akiyama et al. | 179/18 GF |

*Primary Examiner*—Donald J. Yusko
*Attorney, Agent, or Firm*—Robert O. Nimtz

[57] ABSTRACT

Disclosed is an input-mixed rearrangeable network and an output mixed rearrangeable network. In one of the disclosed embodiments, the networks comprise three switching stages with the first switching stage comprising $n$ switches having $n$ input links and $n+1$ output links each, the second switching stage comprising $n+1$ switches with $n$ input links and output links each, and the third switching stage comprising $n$ switches have $n+1$ input links and $n$ output links each. In the input-mixed rearrangeable embodiment, the first and second stage switches are two-sided rearrangeable and the third stage switches are input-mixed rearrangeable. In the output-mixed rearrangeable embodiment, the first stage switches are output-mixed rearrangeable and the second and third stage switches are two-sided rearrangeable.

8 Claims, 4 Drawing Figures

EFFICIENT REARRANGEABLE MULTISTAGE SWITCHING NETWORKS

FIELD OF THE INVENTION

This invention relates to switching networks and, more paritcularly, to rearrangeable switching networks.

BACKGROUND OF THE INVENTION

GENERAL

Switching systems such as the telephone switching network are generally designed to interconnect, upon request, selected pairs of customer terminals from a large plurality of terminals connected to the system. The simplest connecting network capable of such interconnections is a single switching matrix designed to connect any idle customer terminal to any other idle terminal in the network, regardless of whether all other terminals in the network are interconnected therein.

To achieve this capability with a single switching matrix it is necessary to employ a number of elemental switches, or crosspoints, within the matrix which increases as the square of the number of customer terminals served by the network. This may result in matrices having prohibitively large numbers of crosspoints.

Fortunately it is not necessary to employ such a capable switching network because advantage can be taken of the theory of trunking probability which recognizes that seldom are more than 10 percent of the terminals active at any particular time. In view of this theory of trunking probability, it is possible, and economically advantageous, to use a less capable switching network.

One such less capable switching arrangement is realized with a multistage connecting network which comprises an ordered plurality of $s$ interconnected stages ($v_i$). In such a multistage network, each stage $v_i$ includes a plurality of switches $v_{i1}, v_{i2}, \ldots v_{ir_i}$ having input and output links. The input links of each switch in a stage are respectively connected to the output links of switches in the preceding stage while the output links of each switch in a stage are respectively connected to input links of switches in the succeeding stage. The input links of the first stage switches are connected to customer terminals termed input terminals, and the output links of the last stage switches are connected to customer terminals termed output terminals. For purposes of the instant specification, it is assumed that each first stage switch $v_{1j}$ has $n$ input links, that each last stage switch $v_{sj}$ has $n$ output links, that there are $n$ input switches ($r_l = n$) and that there are $n$ output switches ($r_s = n$). Additionally, only a three-stage network ($s = 3$) is described herein, although it is to be understood that the disclosed invention is applicable to any value of $s$.

The words "input" and "output" of phrases "input terminals" and "output terminals" refer, of course, to the arbitrary input and output designations of the switching network. Each "input" or "output" terminal can in fact be the calling or the called party of an interconnection request. In a telephone system, for example, the input terminals may be the telephones of one central office while the output terminals may be the telephones of another central office.

As implied above, it is possible for a customer terminal connected to a multistage switching network to occasionally be blocked from being connected as desired because the network happens to be interconnected in a manner that prevents effecting the desired interconnection. This, of course, is an undesirable situation which, in an appropriately designed network, can be remedied by dismantling existing interconnections and by rearranging the interconnection paths to accommodate the new request. When such a rearrangement is possible, it is said that the new assignment, which is the new set of interconnections desired to be established, is realizable. A switching network which can realize all possible assignments without rearranging existing connections is said to be nonblocking, while a network which can realize all possible assignments only by occasionally rearranging existing connections is said to be merely rearrangeable.

A network is said to be one-sided rearrangeable if it can realize all assignments which interconnect input terminals to all other input terminals, input terminals to output terminals and vice versa, and output terminals to all other output terminals.

A network is said to be two-sided rearrangeable if input terminals can only connect to output terminals (and vice versa).

A network is said to be input-mixed rearrangeable if the input terminals can connect to other input terminals or to output terminals, but output terminals cannot connect to other output terminals. Similarly, a network is said to be output-mixed rearrangeable if output terminals can connect to other output terminals or to input terminals, but input terminals cannot connect to other input terminals.

The above definitions of one-sided rearrangeability, two-sided rearrangeability, input-mixed rearrangeability and output-mixed rearrangeability can be applied to a switch $v_{ij}$ in the same manner as applied to a network.

PRIOR ART

FIG. 1 illustrates a prior art three-stage input-mixed rearrangeable network. It comprises stages $v_1$ (element 10), $v_2$ (element 20) and $v_3$ (element 30). Stage $v_1$, in turn, comprises $r_1$ input-mixed rearrangeable switches $v_{11}, v_{12}, \ldots v_{1r_1}$, stage $v_2$ comprises $r_2$ input-mixed rearrangeable switches $v_{21}, v_{22}, \ldots v_{2r_2}$, and stage $v_3$ comprises $r_3$ two-sided rearrangeable switches $v_{31}, v_{32}, \ldots v_{3r_3}$. As indicated above, $r_1 = n$, $r_3 = n$, switches $v_{1j}$ have $n$ input links each and, similarly, switches $v_{3j}$ have $n$ input links each. Since one output link of each $v_{1j}$ switch is connected to an input link of each $v_{2j}$ switch, and since there are $r_2$ second stage switches, each $v_{1j}$ switch must have $r_2$ output links. For corresponding reasons, each $v_{2j}$ switch has $r_1$ (equal to $n$) input links and $r_3$ (equal to $n$) output links, while each $v_{3j}$ switch has $r_2$ input links and $n$ output links.

To help in ascertaining the number of crosspoints required for each particular type of switch, switches $v_{11}$ and $v_{21}$ are illustrated in FIG. 1 with the prior art internal arrangement of elemental switches, or crosspoints, within each type of switch. Modeled after the switch arrangements shown in "Mathematical Theory of Connecting Networks for Telephone Logic" by V. E. Benes, Academic Press, 1965, Chap. 4, FIGS. 9 and 10, the two-sided rearrangeable switch $v_{31}$ is depicted as a square switch with each input link connected to a bus line that intersects bus lines respectively connected to the output links of the switch. The intersections of the bus lines are connected with normally open elemental switches, e.g. switch 123. It can mathmatically be shown, as well as seen from the drawing of FIG. 1, that the square switch $v_{31}$ is nonblocking, i.e., any input link may be connected to any idle output link in the switch by the closure of a single crosspoint, irrespective of whether the other input links are connected to output links. It can also be seen that, the number of elemental switches, or crosspoints, required to implement a square switch is equal to $xy$ where $x$ is the number of input links and $y$ is the number of output links.

Also in accordance with the above mentioned Benes book, the input-mixed rearrangeable switch $v_{21}$ is depicted as a trapezoidal switch. It may be viewed as a triangular switch section $v_{21}'$ which connects any input link of switch $v_{21}$ to any other input link of switch $v_{21}$, and a square switch section $v_{21}''''$ which connects input links of $v_{21}$ to output links of $v_{21}$. The triangular switch section $v_{21}'$ function is achieved by connecting each input link of $v_{21}$ to a bus line, e.g., 124, which intersects the bus lines of other input links of $v_{21}$. It can be shown that trapezoidal switch $v_{21}$ is nonblocking in the same sense that square switch $v_{31}$ is nonblocking.

From the above it can be seen that the number of crosspoints required for the triangular switch section of the $v_{21}$ type switch (for $x$ input links and $y$ output links) is approximately equal to $x^2/2$ and that the total number of crosspoints required for the $v_{21}$ type switch is approximately $(x^2/2)+xy$. Of course, it should be noted that output-mixed rearrangeable switches are of the same construction as input-mixed rearrangeable switches, although they are drawn as mirror images of each other.

In other for the network of FIG. 1 to be rearrangeable, $r_2$ must be large enough to accommodate all input-terminal to output-terminal connections employing a particular $v_{2j}$ switch, plus whatever input-terminal to other input-terminal connections may need to be made by a switch $v_{2j}$ (connections between input-terminals associated with different $v_{1j}$ switches). It can be shown that for the network of FIG. 1 to be rearrangeable, $r_2$ must at least be equal to $3n/2$. Calculating the total number of crosspoints required of the network of FIG. 1 results in $23n^3/4$ crosspoints.

SUMMARY OF THE INVENTION

It is an object of this invention to construct an input-mixed or an output-mixed rearrangeable network which has a number of crosspoints lower than the number of crosspoints required for the above prior art network.

Input-mixed rearrangeability is realized, in accordance with the principles of this invention, with a three stage switching network having two-sided rearrangeable switches in the first and second switching stages and having input-mixed rearrangeable switches in the third switching stage. Output-mixed rearrangeability is realized with a three stage switching network having output-mixed rearrangeable switches in the first switching stage and two-sided rearrangeable switches in the second and third switching stages. In both embodiments, with a number of associated customer terminals being equal to $2n^2$ ($n^2$ input terminals and $n^2$ output terminals), the number of first and third stage switches is equal to $n$ and the number of second stage switches is equal to $n+1$, resulting in approximately $7n^3/2$ crosspoints.

DETAILED DESCRIPTION

Figure 1:
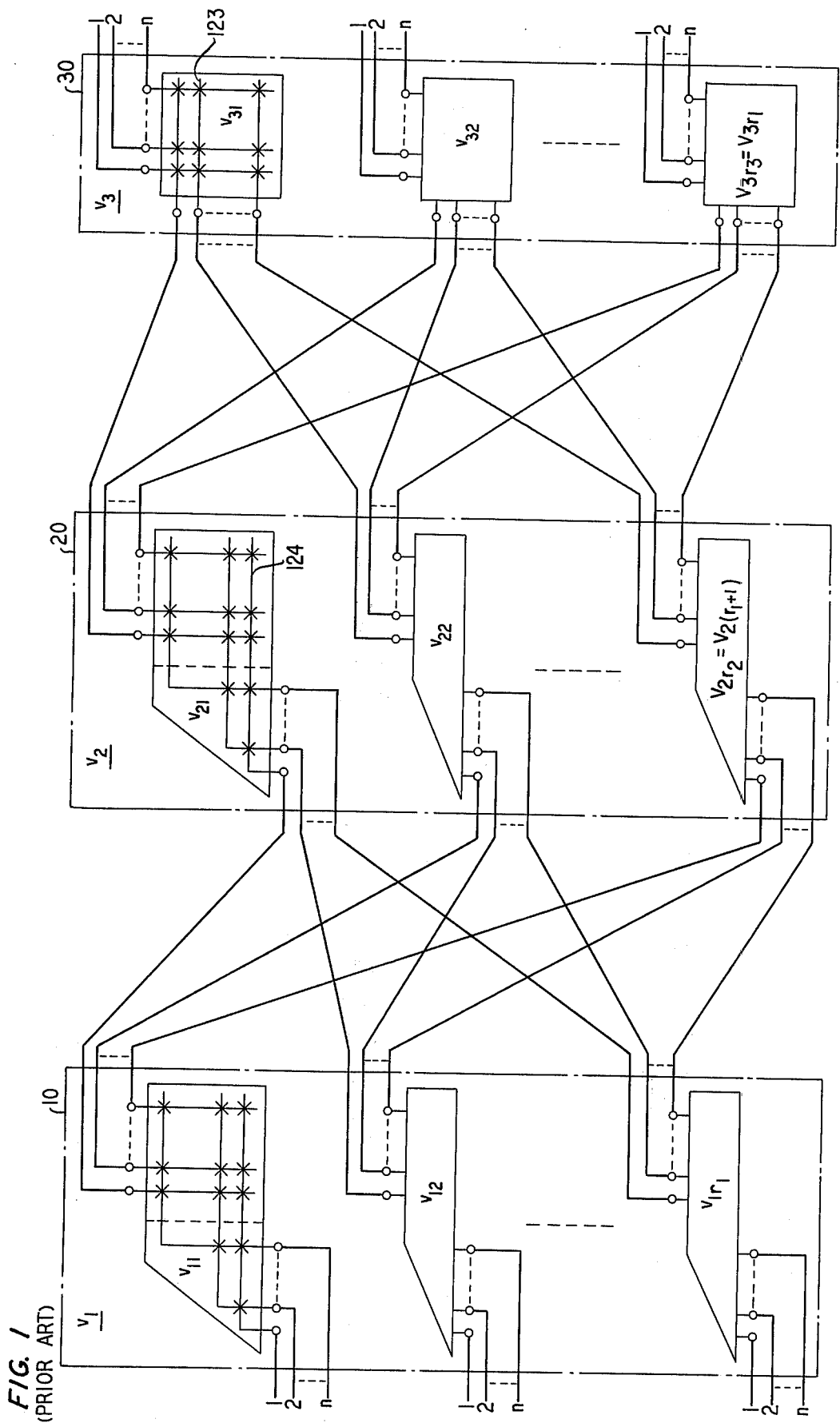
FIG. 1 depicts a block diagram of a prior art configuration for an input-mixed rearrangeable multistage switching network.

FIG. 1 depicts a block diagram of a prior art input mixed rearrangeable network which was, in the interest of simplicity, limited to three stages. To make the FIG. 1 network operate, however, a control section must be employed which would maintain the necessary data related to the existing assignment and which would be capable of altering the assignment of the FIG. 1 network in response to additional interconnection request. This control section is not illustrated in FIG. 1 because it relates only peripherally to the subject matter of this invention, and inclusion thereof, it is believed, would only confuse the issue.

Figure 2:
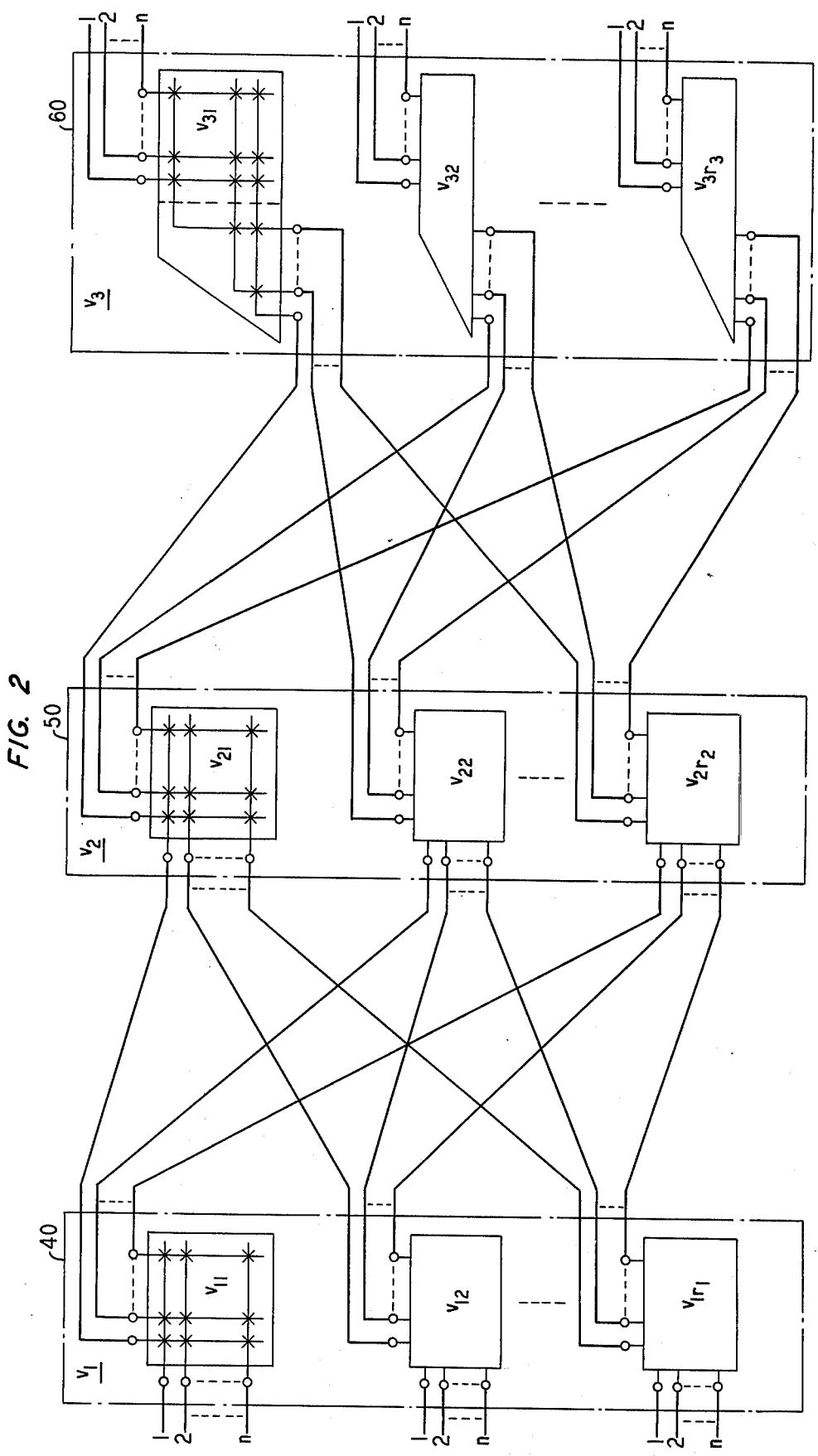
FIG. 2 depicts a block diagram of an input-mixed rearrangeable multistage switching network in accordance with the principles of this invention.

For similar reasons, FIG. 2, which presents the block diagram of a three stage input-mixed rearrangeable network in accordance with the principle of this invention, also does not illustrate the control section associated with the network. It is noted, however, that any of a number of known suitable controllers may be employed to control the networks of FIGS. 1 and 2 and that whatever control section is employed in conjunction with the network of FIG. 1 may also be employed in conjunction with the network of FIG. 2. For those interested, reference is made to a control section described by M. C. Paull in U.S. Pat. No. 3,129,407 issued Apr. 14, 1964.

As illustrated, FIG. 2 comprises a first switching stage, 40, designated $v_1$, a second switching stage, 50, designated $v_2$, and a third switching stage, 60, designated $v_3$. Each switching stage $v_i$ contains an $r_i$ plurality of switches $v_{ij} j=1, 2 \ldots r_i$ and each $v_{ij}$ switch contains input links and output links. As in the network of FIG. 1, there are $n$ input-mixed rearrangeable switches in stage $v_1$, each having $n$ input links and $r_2$ output links respectively connected to $r_2$ switches in $v_2$, and $n$ output-mixed rearrangeable switches in stage $v_3$, each having $n$ output links and $r_2$ input links respectively connected to the $r_2$ switches in $v_2$.

The circuit of FIG. 2, which depicts an input-mixed network, differs from the circuit of FIG. 1, which also depicts an input-mixed network, in that, in accordance with the principles of this invention, $r_2$ need not be greater than $n+1$, and in that the $v_1$ and $v_2$ switches are two-sided rearrangeable and the $v_3$ switches are input-mixed rearrangeable. A corresponding difference is found between a prior art output-mixed embodiment and an output-mixed embodiment in accordance with the principles of this invention.

Heuristically, it can be shown that the multistage connecting network of FIG. 2 is an input-mixed rearrangeable network when the following is observed;

1. Any customer terminal connected to a particular link of a switch $v_{1j}$ can connect to any selected output link of that switch. Selecting the output link wherein the customer terminal appears, effectively selects the stage $v_2$ switch to which the input terminal is connected.

2. If a sufficient number of stage $v_2$ switches is provided, i.e., if $r_2$ is sufficiently large, all $n^2$ input terminals may be transmitted through switching stages $v_1$ and $v_2$ and arranged to appear at the input links of stage $v_3$.

3. Since stages $v_1$ and $v_2$ are two-sided rearrangeable, the input terminals may be arranged (or rearranged) to appear in any selected order at the input of stage $v_3$.

4. Input terminals may be interconnected within stage $v_3$ since the $v_{3j}$ switches are input-mixed rearrangeable. Two input links of a switch $v_3$ are employed for each input terminal/input terminal interconnection.

5. All $n^2$ input terminals may be interconnected in switching stage $v_3$ if $n$ is even and $r_2 = n$, or if $n$ is odd and $r_2 = n+1$.

6. It appears that the worst case would occur when a single output terminal associated with each switch $v_{3j}$ is active and connected to an input terminal. In such a case, the number of available links in each of the $n$ $v_{3j}$ switches is $r_2 - 1$, and the number of input terminals that may need to be interconnected to each other is $n^2 - n$ (or an average of $n-1$ input-mixed interconnections per switch). Since each switch can interconnect only an even number of input terminals, if $n$ is even, some switches must accomodate $n + 1$ input terminals (requiring $r_2$ to equal $n+1$) while other switches can accommodate $n-1$ input terminals. When $n$ is odd, all stage $v_3$ switches would, under the above apparently worst case condition, need to accomodate only $n-1$ input terminals.

7. From points 5 and 6 it is seen that whether $n$ is even or odd, for the circuit of FIG. 2 to be input-mixed rearrangeable, $r_2$ must at least be equal to $n+1$. With $r_1$ and $r_3$ being equal to $n$ and $r_2$ being equal to $n+1$, the number of crosspoints required for stage $v_1$ is $n^3+n^2$, the number of crosspoints required for stage $v_2$ is $n^3 + n^2$, and the number of crosspoints required for stage $v_2$ is $(3/2)n^3 + 2n^2 + n/2$. The total number of crosspoints required for the connecting network of FIG. 2 is $7/2\ n^3 + 4n^2 + n/2$, which for $n >> 1$ approximately equals $(7\ 2)n^3$. This compares favorably with the $(25/4)n^3$ crosspoint count of the prior art network of FIG. 1.

Actually, if more than one switch is permitted to be closed for any particular interconnection, it may be shown that a square two-sided rearrangeable switch having a number of output links that is at least equal to the number of input links is also input-mixed rearrangeable. This can be appreciated when it is realized that an input-mixed assignment can be decomposed into two two-sided assignments which may be connected to the same output link bus by the closure of two crosspoints. If this simplification is employed in the network of FIG. 2, the input-mixed rearrangeable switches of stage $v_3$ can be replaced with two-sided rearrangeable switches to further reduce the crosspoint count of the FIG. 2 network to $3n^3$ crosspoints.

EXAMPLE

The following example is presented to illustrate the rearrangeability property of the FIG. 2 circuit and to help in understanding the heuristic proof presented above.

Consider the input-mixed assignment $$[(I_{11},I_{13}),\ (I_{23},\ I_{31}),\ (I_{21},\ I_{42}),\ (I_{14},O_{13}),\ (I_{12},O_{23}),\ (I_{31},O_{32}),\ (I_{34},O_{22}),\ (I_{44},O_{43})]$$

where $I_{ij}$ designates the $j^{th}$ input terminal in the $i^{th}$ switch of stage $v_1$, where $O_{ij}$ designates the $j^{th}$ output terminal in the $i^{th}$ switch of stage $v_3$ and where the two terminals parenthesized signify a desired interconnection.

Figure 3:
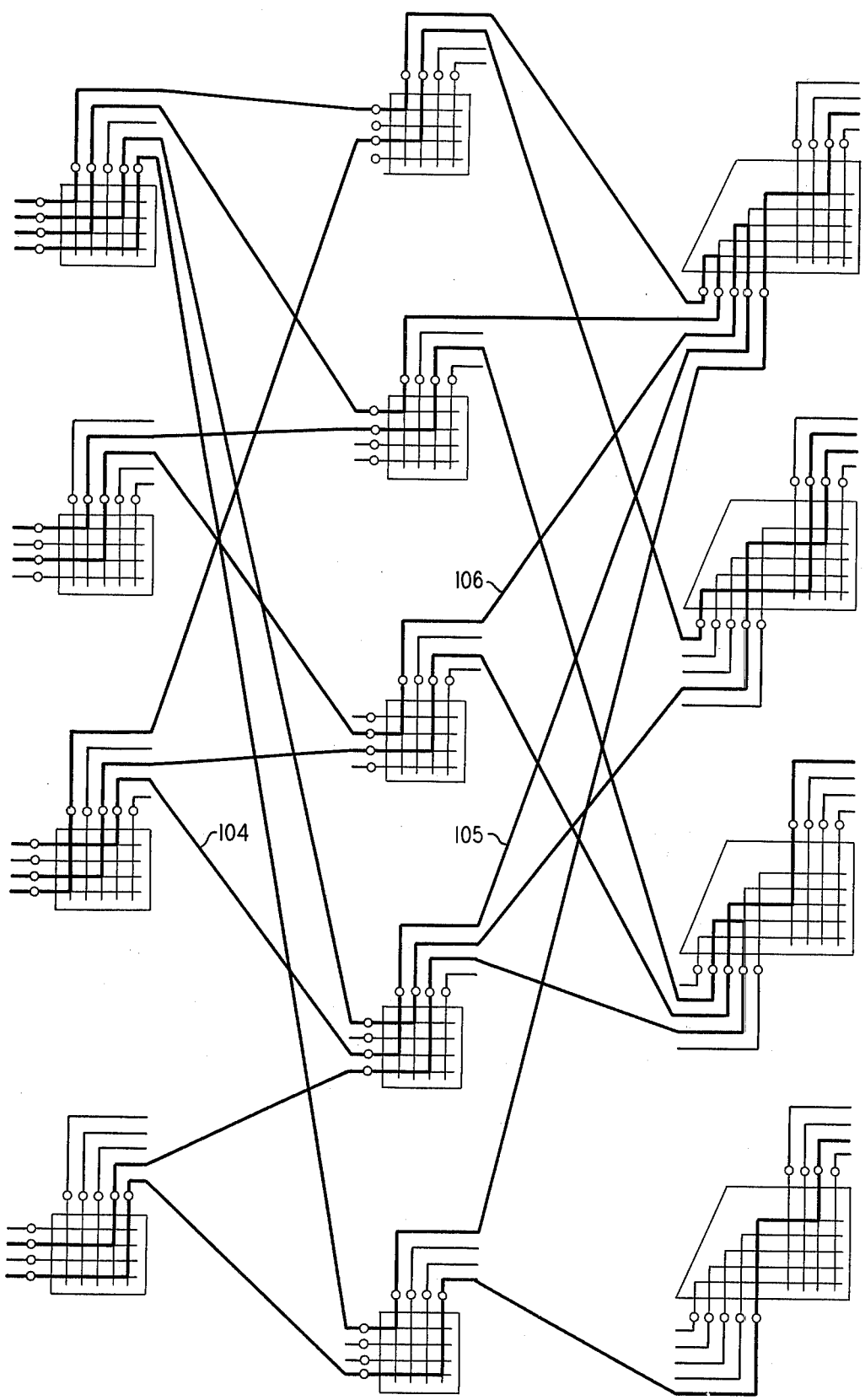
FIG. 3 illustrates the interconnection paths of the FIG. 2 network arranged to implement a selected assignment.

FIG. 3 shows the interconnection of the above assignment in a switching network in accordance with the principles of this invention with $n = 4$ and $r_2 = 5$. The interconnections of FIG. 4 were derived by proceeding in accordance with the following method:

1. The number of output terminals involved in two-sided interconnections is subtracted from the available input links of the associated stage $v_3$ switches (of which there are $n+1$). In the above example, switch $v_{31}$ must service the $(I_{14},O_{13})$ connection, leaving 4 input links availiable for the input-mixed connections, switch $v_{32}$ must service the $(I_{12},O_{23})$ and $(I_{34},O_{22})$ connections, leaving 3 input links available for the input-mixed connections, switch $v_{33}$ must service the $(I_{33},O_{31})$ connection, leaving 4 input links available for the input-mixed connections, and switch $v_{34}$ must service the $(I_{44},O_{43})$ connection, also leaving 4 input links available for the input-mixed connections.

2. All input-mixed connections are converted into pairs of two-sided connections employing a particular stage $v_3$ switch, subject to the condition that a particular $v_{3j}$ switch cannot be assigned a number of times in excess of the number of input links available after completion of step 1 above. In the above example, therefore, $$(I_{11},I_{13}) = [(I_{11},\ v_{31})(I_{13},v_{31})]$$
$$(I_{23},I_{31}) = [(I_{23},v_{31})(I_{31},v_{31})]$$

and $$(I_{21},I_{42}) = [(I_{21},v_{33})(I_{42},v_{33})]$$

3. The combined set of two-sided connections are partitioned into $n+1$ groups such that no stage $v_1$ or stage $v_3$ switch (or a terminal employing same) is repeated within a group. In the above example, five groups ($n+1=5$) were generated as follows:

$$G1 = [(I_{11},v_1),\ (I_{34},O_{22})]$$
$$G2 = [(I_{13},v_1),\ (I_{21},v_3)]$$
$$G3 = [(I_{23},v_1),\ (I_{33},O_{31})]$$
$$G4 = [(I_{12},O_{23}),\ (I_{31},v_1),\ (I_{42},v_3)]$$

and $$G5 = [(I_{14},O_{13}),\ (I_{44},O_{43})].$$

4. The assignments in each group are implemented with connections through a single switch in stage $v_2$. That is, each $v_{2i}$ switch is associated with a group $Gi$. The interconnections of the above groups are depicted in FIG. 3.

From FIG. 3 it may be observed that switch $v_{31}$ is fully utilized with respect to its input links, that switch $v_{32}$ has three links left available, that switch $v_{33}$ has two input links left available and that switch $v_{34}$ has four input links left available. Thus, switches $v_{32}$ and $v_{33}$ can accommodate one additional input-mixed connection and switch $v_{34}$ can accommodate two additional input-mixed connections.

In accordance with the property of networks that are merely rearrangeable, when an additional interconnection request is presented to the network of FIG. 3, the existing interconnections may need to be altered, or rearranged, in order to accommodate the particular request made. Such an alteration is required if, for example, additional requests $(I_{24},O_{11})$ and $(I_{41},I_{43})$ are presented. Proceeding with the method outlined above with an eye towards minimizing the alterations necessary, a set of interconnections has been developed for implementing the new assignment. This new set of interconnections is depicted in FIG. 4.

Figure 4:
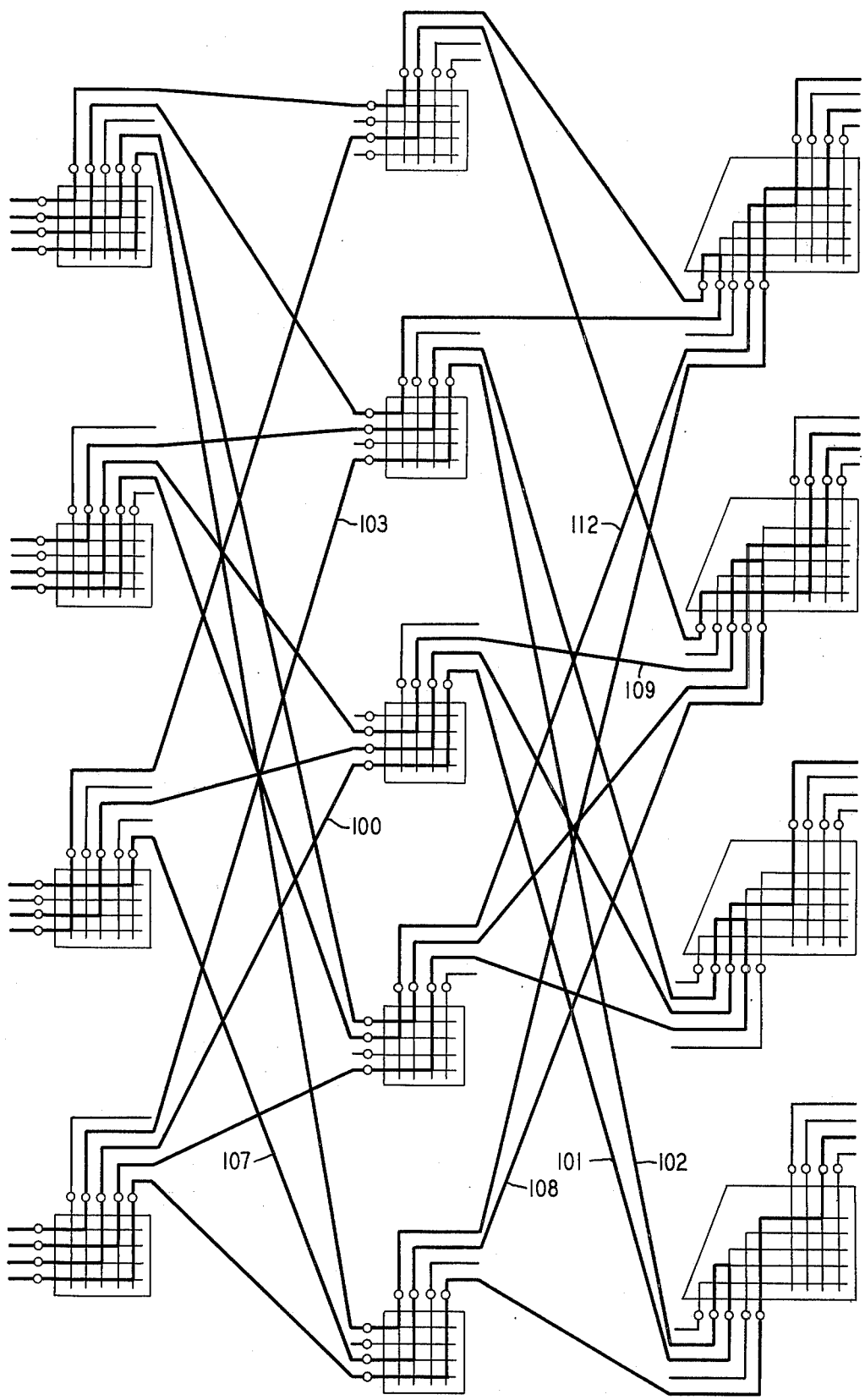
FIG. 4 illustrates the interconnection paths of the FIG. 2 network arranged to inplement an assignment that is slightly modified from the assignment of FIG. 3.

From FIG. 3 and 4 it can be seen that the $(I_{41}, I_{43})$ request may be, and is, interconnected without altering the arrangement of FIG. 3 by utilizing switch $v_{34}$, the available paths through switches $v_{22}$ and $v_{23}$, and by employing interconnection paths 100, 101, 102 and 103 (in FIG. 4). The $(I_{24}, O_{11})$ request, however, does require alterations because all the input links of switch $v_{31}$ have been used up in the previous assignment. The set of interconnections of FIG. 3 may be rearranged by dismantling interconnections 104, 105, and 106 (dismantling thereby the $(I_{24}, I_{31})$ connection) and by interconnecting terminal $I_{23}$ to terminal $I_{31}$, in accordance with FIG. 4, with interconnection paths 107, 108 and 109. The dismantling of interconnections 105 and 106 releases two input links of switch $v_{31}$, and this release enables the $(I_{24}, O_{11})$ interconnection to be implemented with interconnection paths 111 and 112.

It should be noted that the embodiments illustrated and described herein are merely illustrative of the principles of this invention and should not be construed as fully depicting my invention. Particularly, it should be realized that the various simplifications introduced into the description were introduced only to simplify the drawings and to make the discussion more concise. It should be appreciated, for example, that the circuit of FIG. 2 can be implemented with any number of input and output terminals and with any number of stages. For example, any two-sided rearrangeable switch can be decomposed into a three stage two-sided rearrangeable network composed of smaller switches. It should further be appreciated that the network of FIG. 2 is symmetrical and that, therefore, an output-mixed rearrangeable network can be constructed in accordance with the principles of this invention by simply substituting output-mixed rearrangeable switches for the two-sided rearrangeable switches of stage $V_1$, and by substituting two-sided rearrangeable switches for the input-mixed rearrangeable switches of stage $v_3$

What is claimed is:

1. A multistage switching network subdivided into a first stage, a second stage, and a third stage characterized in that:
   said first stage comprises an $n$ plurality of switches;
   said second stage comprises no more than an $n+1$ plurality of switches;
   said third stage comprises an $n$ plurality of switches; and
   exactly two of said stages comprise two-sided rearrangeable switches.

2. A multistage switching network having a first stage, a second stage connected to said first stage, and a third stage connected to said second stage, characterized in that:
   said first stage comprises an $n$ plurality of switches;
   said second stage comprises no more than an $n+1$ plurality of switches;
   said third stage comprises an $n$ plurality of switches; and
   exactly two of said stages comprises two-sided rearrangeable switches.

3. The switching network of claim 2 wherein the switches of said first and second stages are two-sided rearrangeable and wherein the switches of said third stage are input-mixed rearrangeable.

4. Switching network of claim 2 wherein the switches of said first stage are output-mixed rearrangeable and wherein the switches of said second and third stages are two-sided rearrangeable.

5. An input-mixed rearrangeable switching network comprising:
   a first plurality of two-sided rearrangeable switches connected to said input terminals;
   a second plurality of two-sided rearrangeable switches wherein each of the input links in each of said switches in said second plurality of switches is connected to an output link of a different switch in said first plurality of switches; and
   a third plurality of input-mixed rearrangeable switches wherein the output links of said third plurality of switches are connected to said output terminals and wherein each of the input links in each of said switches in said third plurality of switches is connected to an output link of a different switch in said second plurality of switches.

6. The switching network of claim 5 wherein the number of switches of said first plurality of switches is equal to the number of switches in third plurality of switches, and the number of switches in said second plurality of switches is equal to one plus said number of switches in said third plurality of switches.

7. An output-mixed rearrangeable switching network comprising:
   a first plurality of output-mixed rearrangeable switches connected to said input terminals;
   a second plurality of two-sided rearrangeable switches wherein each of the input links in each of said switches in said second plurality of switches is connected to an output link of a different switch in said first plurality of switches; and
   a third plurality of two-sided rearrangeable switches wherein the output links of said third plurality of switches are connected to said output terminals and wherein each of the input links in each of said switches in said third plurality of switches is connected to an output link of a different switch in said second plurality of switches.

8. The switching network of claim 7 wherein the number of switches of said first plurality of switches is equal to the number of switches in said third plurality of switches and the number of switches in said second plurality of switches is equal to one plus said number of switches in said third plurality of switches.

* * * * *